(12) United States Patent
Kikuchi

(10) Patent No.: US 7,590,709 B2
(45) Date of Patent: Sep. 15, 2009

(54) SEARCH METHOD AND SEARCH BROKER

(75) Inventor: Katsuro Kikuchi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 842 days.

(21) Appl. No.: 10/784,766

(22) Filed: Feb. 24, 2004

(65) Prior Publication Data
US 2005/0050173 A1 Mar. 3, 2005

(30) Foreign Application Priority Data
Sep. 2, 2003 (JP) .............................. 2003-310479

(51) Int. Cl.
*G06F 15/16* (2006.01)
*G06F 7/00* (2006.01)
*G06F 17/30* (2006.01)
*G06F 3/00* (2006.01)

(52) U.S. Cl. ............... 709/219; 709/217; 707/E17.109; 707/104.1; 719/310

(58) Field of Classification Search ............... 709/217, 709/219; 707/E17.109, 104.1; 719/310
See application file for complete search history.

(56) References Cited

U.S. PATENT DOCUMENTS

| | | | | |
|---|---|---|---|---|
| 6,199,099 | B1 * | 3/2001 | Gershman et al. | 709/203 |
| 6,697,824 | B1 * | 2/2004 | Bowman-Amuah | 709/229 |
| 6,904,449 | B1 * | 6/2005 | Quinones | 709/203 |
| 6,957,199 | B1 * | 10/2005 | Fisher | 705/78 |
| 7,194,524 | B2 * | 3/2007 | Suzuki et al. | 709/219 |
| 2001/0034771 | A1 * | 10/2001 | Hutsch et al. | 709/217 |
| 2002/0156865 | A1 * | 10/2002 | Rajarajan et al. | 709/217 |
| 2003/0055817 | A1 | 3/2003 | Yoshimura et al. | |
| 2003/0120593 | A1 * | 6/2003 | Bansal et al. | 705/39 |
| 2004/0010542 | A1 * | 1/2004 | Kumar et al. | 709/203 |
| 2004/0133660 | A1 * | 7/2004 | Junghuber et al. | 709/219 |
| 2004/0205101 | A1 * | 10/2004 | Radhakrishnan | 709/200 |
| 2004/0230676 | A1 * | 11/2004 | Spivack et al. | 709/223 |
| 2005/0010653 | A1 * | 1/2005 | McCanne | 709/219 |

FOREIGN PATENT DOCUMENTS

JP 2003-091553 9/2001

OTHER PUBLICATIONS

Common Object Request Broker Architecture, v3.0, Jul. 2002, pp. 2-1 to 2-5.
Web Service Definition Language, http://www.w3.org/TR.wsdl, 25 pages.
Naming Service Specification, Feb. 2001, 4 pages.
Japanese Patent Office Office Action dated Jan. 19, 2009, in Japanese.

* cited by examiner

*Primary Examiner*—William C Vaughn, Jr.
*Assistant Examiner*—Muktesh G Gupta
(74) *Attorney, Agent, or Firm*—Stites & Harbison PLLC; Juan Carlos A. Marquez, Esq.

(57) ABSTRACT

The search method comprises a first step of receiving a service inquiry request; a second step of making an inquiry about policy information of a client 100 who requested service and obtaining the policy information of the client 100 from a policy database 103; a third step of sending a request to search for a server matching the service sought after by the request and obtaining information showing the server matching the service from a registry 109; a fourth step of extracting a server meeting the policy information of the client obtained in the second step out of servers related to the information obtained in the third step; and a fifth step of transmitting information showing the server extracted in the fourth step to the source of the request to search for service.

9 Claims, 10 Drawing Sheets

```
<xml?>
<get-policy>
<service>LOCAL SIGHTSEEING TOUR SERVICE</service>      ——500
<session-id>xyz1234567</session-id>      ——501
<get-policy>
```

FIG. 7

| KING OF SERVICE | POLICY ITEM | POLICY CONDITION |
|---|---|---|
| SIGHTSEEING TOUR | NURSING CARE SERVICE | AVAILABLE |
| SIGHTSEEING TOUR | RATING | AA OR HIGHER |
| .. | .. | .. |
| HOTEL SERVICE | .. | .. |
| .. | .. | .. |
| BUS SERVICE | .. | .. |
| .. | .. | .. |

```
<xml?>
<policy-list>
<item>
<name> NURSING CARE SERVICE </name>
<condition> AVAILABLE </condition>
   </item>
<item>
<name> RATING </name>
<condition> AA OR HIGHER </condition>
   </item>
<policy-list>
```

```
<xml?>
<search-services>
<service>LOCAL SIGHTSEEING TOUR SERVICE</service>
<search-services>
```
— 900

FIG. 11

| KIND OF SERVICE | ELEMENT SERVICE PROVIDING SERVER | CONTENT OF SERVICE |
|---|---|---|
| HOTEL SERVICE | HOTEL SERVICE α | I/F, RATING, AVAILABILITY OF NURSING CARE, ·· |
| : | : | .. |
| LOCAL SIGHTSEEING TOUR | LOCAL TOUR SERVICE A | .. |
| : | : | .. |
| BUS SERVICE | BUS SERVICE I | .. |
| : | : | .. |

FIG. 12

```
<xml?>
<service-list>
<item>
<name> HOTEL SERVICE α </name>                              ——1200
<service-port>http://... </service-port>                    ——1201
<attributes>
    <item name="NURSING CARE SERVICE"> AVAILABLE </item>    ——1202
    <item name="RATING"> AA </item>                         ——1203
</ attributes>
    </item>
<item>
<name> HOTEL SERVICE β </name>                              ——1200
<service-port>http://... </service-port>                    ——1201
<attributes>
    <item name="NURSING CARE SERVICE"> NOT AVAILABLE </item> ——1202
    <item name="RATING"> AA </item>                         ——1203
</ attributes>
    </item>
    <item>
     ..
    </item>
<service-list>
```

```
<xml?>
<service-list>
<item>
<name> HOTEL SERVICE α </name>
<service-port>http://...</service-port>
  </item>
<service-list>
```

FIG. 15

| KIND OF SERVICE | ELEMENT SERVICE PROVIDING SERVER | CONTENT OF SERVICE |
|---|---|---|
| HOTEL SERVICE | HOTEL SERVICE α | CONNECTION I/F, LOCATION, ·· |
| : | : | ·· |
| LOCAL SIGHTSEEING TOUR | LOCAL TOUR SERVICE A | ·· |
| : | : | ·· |
| BUS SERVICE | BUS SERVICE I | ·· |
| : | : | ·· |

FIG. 16

| ELEMENT SERVICE PROVIDING SERVER | ADDITIONAL INFORMATION |
|---|---|
| HOTEL SERVICE α | RATING, AVAILABILITY OF NURSING CARE, ·· |
| : | ·· |
| LOCAL TOUR SERVICE A | ·· |
| : | ·· |
| BUS SERVICE I | ·· |
| : | ·· |

| EVALUATION ITEM | EVALUATION METHOD |
|---|---|
| BUS RIDE QUALITY | 5-LEVEL EVALUATION |
| ATTITUDE OF ATTENDANTS | 5-LEVEL EVALUATION |
| SERVICE BY HOTEL WORKERS | 5-LEVEL EVALUATION |
| QUALITY OF ROOM | 5-LEVEL EVALUATION |

SEARCH METHOD AND SEARCH BROKER

FIELD OF THE INVENTION

Background of the Invention

The present invention relates to services such as Web Services, each realized by a hierarchical combination of a plurality of services, and more particularly to a method for searching for service reflecting various policies related to the use of services by users and servers and also to a search broker for searching for service.

For distributed processing by a plurality of computers connected to a computer network, such as the Internet, a client server system is generally used. By using distributed object technology, such as CORBA (Common Object Request Broker Architecture) as shown in Common Object Request Broker architecture: Core Specification, hppt://www.omg.org/cgi-bin/apps/doc formal/02-09-0.2pdf, Section 2-1~2-5, COM (Component Object Model) or RMI (Remote Method Invocation), a functionally-coarse-grain process can be reduced in size to fine-grain "module" components, which are then combined and supplied as a single service (service used hereunder concerns a collection of related network endpoints in WSDL documents).

Before combining modules, a combination of modules may be decided statically, but it is possible to dynamically select and combine modules by using a module-information database called a "registry". The registry chiefly stores the contents of service and methods for calling service. In each of the above-mentioned distributed object technologies, a specific communication protocol is used, for which reason generally communication cannot pass through firewalls and therefore communication takes place mainly in intra-office networks.

On the other hand, HTTP (Hyper Text Transfer Protocol) as a communication protocol on WWW (World Wide Web) and SMTP (Simple Message Transfer Protocol) as an e-mail protocol are intended chiefly for data communication with the outside world (Internet) and are so designed as to allow messages to pass through firewalls, making it possible to exchange data with the external servers. By virtue of the data description meta-language called XML (extensible Markup Language), the methods of computer-independent, flexible text-based data description are rapidly spreading.

With those technologies as the backdrop, a distributed object technology called "Web Service" is in the on-going process of evolution. Web Service is used in two definitions. In the wide definition, Web Service includes services in general which use WWW and HTTP/XML-based RPC (Remote Procedure Call). In the narrow definition, Web Service covers services with technologies centering around SOAP (Simple Object Access Protocol), UDDI (Universal Directory and Discovery Interface) and WSDL (Web Services Description Language). In this specification, Web Service is used in the latter narrow sense. Since Web Service uses HTTP and SMTP as communication protocols, it is expected that distributed systems are not only built in business corporations but also set up as inter-corporate systems.

Service interfaces are described by WSDL in Web Service as shown in Web Service Description Language (WSDL) 1.1, http://www.w3.org/TR/2001/NOTE-wsdl-20010315, Sections 1~3.8. The definition of WSDL includes the definition of the data format of a message that a client transmits to a server when service is provided and the definition of the data format of a message showing a result of service execution that the server returns to the client. A WSDL description includes information about the place where service is provided, and the information about the place is normally indicated by the URL (Uniform Resource Locator) of the server.

Messages exchanged between the client and the server are written in XML, converted from the internal program format to the XML format by the client program or server program, and transmitted over the network. In Web Service, messages of XML format are exchanged between the client and the server by using a SOAP protocol. A SOAP message is normally encapsulated in a HTTP (Hypertext Transfer Protocol) format as the standard Internet protocol when it is transmitted.

As described, because the interface for service is given a clear-cut definition, it is easy to divide a service process into module components in the network. Since HTTP can be used as the basic communication protocol in Web Service, the network transparency is very high and the portability of components is also high.

In Web Service, as in CORBA, COM and RMI mentioned above, components provided as Web Service modules (service components) can be combined to realize service functions of larger sizes. In other words, by combining service modules (service components), the productivity in building service can be improved. Further, it is possible for the user to obtain new service by utilizing existing service components from the service provider; as a result, the service provider can focus its effort only on service it provides and can reduce cost required to develop service.

To enable reuse, the service components are managed by a registry and stored together with interface descriptions of service components in the registry. The registry has service components recorded in it, and when receiving a request, searches for service according to the interfaces or the function. A service provider, when going to build new service, procures necessary service components to build service by searching for service components from the registry. The service provider organizes new service by combining service components. When combining service components, it is possible to previously decide service components to use, or dynamically search the registry when new service is launched, and formulate a new service plan.

In a distributed object system such as this, each service component generally has a hierarchical structure, but some service components may be formed of components of other services on which they depend. In service formed in a hierarchical structure such as this, the relation among the individual service components is generally loose, and they are combined only according to the publicized interface definitions and functions. Each service component independently provides a specific function, and in many cases the individual service components are supplied by different service providers.

Therefore, under the circumstances when service components have come to be registered in plenty in the registry, the service providers have only to realize the components peculiar to service they provide (interfaces to the user, for example), and therefore make use of service components they searched for on the registry.

Once a market is established for service components, it may occur that a plurality of service providers provide the same kind of service to certain kinds of service parts. More specifically, when service is to be created, if one searches a registry for specific service, a plurality of service components may be obtained as a search result. Which service component is selected out of the plurality of service components depends on the will (policy) of the service provider that provides service. The criterion by which to select one service component from multiple service components is the client's policy with regard to the service provider which provides service or the client's policy with regard to the content of service, for example.

SUMMARY OF THE INVENTION

As has been described, with the wide spread of the foundation on which services of a hierarchical structure can be provided, what becomes a problem is the compatibility of the contents of service provided by individual service components (element services) with the client's requests for service. The requests of the clients for service are diverse, including, for example, a request related to service quality, a request associated with the confidence of the service provider that provides service, and so on. Therefore, it is difficult to prepare a single item of service which meets all of diverse requests from clients (policies of clients).

Among the methods for applying diverse policies of clients, there is a method in which the policies of a client are specified as parameters when service is put into practice, and service is provided according to the policies input on the provider's side. However, this method has a shortcoming that the number of parameters becomes great as the hierarchical structure of service becomes large. The increase in the number of parameters gives rise to an aggravating usability for the clients and a rising implementation cost of service for the service provider that provides element services; therefore, this makes it difficult to provide service itself. Furthermore, it is also difficult to accept a request for upper-stratum element services by assuming the parameters of all of lower-stratum element services.

Out of the necessity to apply a policy to the multi-strata structure of service, the present invention has as its object to provide a method for providing service itemized as (A) to (C) as follows.

(A) Instead of specifying parameters for different requests for service, the present invention provides a scheme in which policy information of a client is defined in advance to make it possible to change the structure of service by referring to the policy information of the client when service is put into practice.

(B) Because the policy information of a client often includes something like privacy or classified information, it is much of a problem to disclose it to the element services side. Therefore, another scheme is provided which permits lower-stratum services to be searched for without disclosing policies to the element services side.

(C) Yet another scheme is required to reflect the policies of an element service provider to service, in addition to taking the client's policy into account. The element service providers have know-how of their own and this method satisfies their desire to reflect the know-how to service they provide.

The reason why it has been difficult to reflect the policy of the client in the structure of service is that the scheme for applying the client's policy to service has not been established as the basis for providing service.

For this reason, the present invention provides schemes for applying the policies related to the structure of service. More specifically, the following means (A) to (C) are provided which correspond to problems (A) to (C).

(A) A policy database is set up to store policy information of clients. A policy management server is provided to obtain and return policy information from the policy database in answer to a request. When element service searches for element service at the subsequent stage, means (B), which is to be described below, is used to obtain a list of element services which have been filtered with reference to the policy of a client. The element service, which made a search request, calls up an appropriate element service from the list of element services in which the policy of the client was reflected. Thus, it becomes possible to dynamically formulate element service in which the client's policy was reflected.

(B) The policy database and the policy management server of the clients are under the administration of the portal server that accepts requests from clients. A search broker is set up to carry out by proxy searching for an element service and reflecting policies. This search broker accepts a request from an element service provider to search for an element service at the subsequent stage, and returns a search result reflecting the policy of the client, namely, a list of element services to the requester, as described as follows. First, the search broker makes inquiries to the policy management server about the policy of the client. Then, the search broker searches the registry for element services and obtains a list of element services. From the obtained list, the search broker extracts only element services that match the policy provided. Finally, the search broker returns a list of extracted element services to the requester for the search for element service. Consequently, service can be organized in a form reflecting the policy of the client without disclosing the policy information of the client to the requester for the search for element service.

(C) In each of element services, an element service provider's policy database is provided which stores the policies, such as know-how, of the element service itself. The element service applies policies in the provider's policy database to a search result sent from the search broker and decides an element service at the next stage. In this way, know-how in the possession of the element service provider can be used as a measure to select element services. When it returns its own process result to the element service the previous stage, the element service simultaneously returns evaluation items (the evaluation items to the client) of the element service at the subsequent stage that the element service used. The portal server, after using the evaluation items collected from the element service at the subsequent stage, supplies the client with those items to have service evaluated by the client in these respects. The evaluation by the client of the respective element services is reflected recursively to the provider's policy database. With regard to application of policies, the credibility of the client (the frequency of use, for example) is taken into consideration, for the users with a high level of credibility, their policies are reflected automatically; however, with the users with low credibility, their policies are reflected manually by the operator. Thus, it is possible to expand the element service provider's policy database, which includes the provider's know-how.

As the user defines policies, it follows that service can be built (customized) without going so far as to trouble the user about this work. Because the policy information of the user is not revealed to the element service supplying server, a problem can be precluded, such as the abuse of private information by a provider of an element service providing server or leakage of private information by cracking a provider of an element service server. Considering a fact that the wider information spreads, the more difficult it becomes to protect the information; therefore, in the present invention, it is arranged for information (policies) to be managed and used locally to reduce the danger of information leakage.

By feeding back the user's evaluation of element service to the policy database of the provider of an element service server, the policy information in the element service provider can be automatically maintained and increased.

Other objects, features and advantages of the invention will become apparent from the following description of the embodiments of the invention taken in conjunction with the accompanying drawings.

BRIEF DESCRIPTION OF THE DRAWINGS

FIG. 7 is a table showing an example of the content recorded in the policy management server 102, according to the first embodiment of the present invention;

FIG. 8 is an explanatory diagram showing an example of policy information sent by the policy management server 102 to the search broker 107, according to the first embodiment of the present invention;

FIG. 11 is a table showing an example of the content held in a registry database 109, according to the first embodiment of the present invention;

FIG. 12 is an explanatory diagram showing an example of a telegram containing a list of element service providing servers sent from the registry management server 108 to the search broker 107, according to the first embodiment of the present invention;

FIG. 15 is a table showing an example of the content held in the registry database 109, according to the second embodiment of the present invention;

FIG. 16 is a table showing an example of the content of an additional information database 1402, according to the second embodiment of the present invention;

DESCRIPTION OF THE EMBODIMENTS

Figure 1:
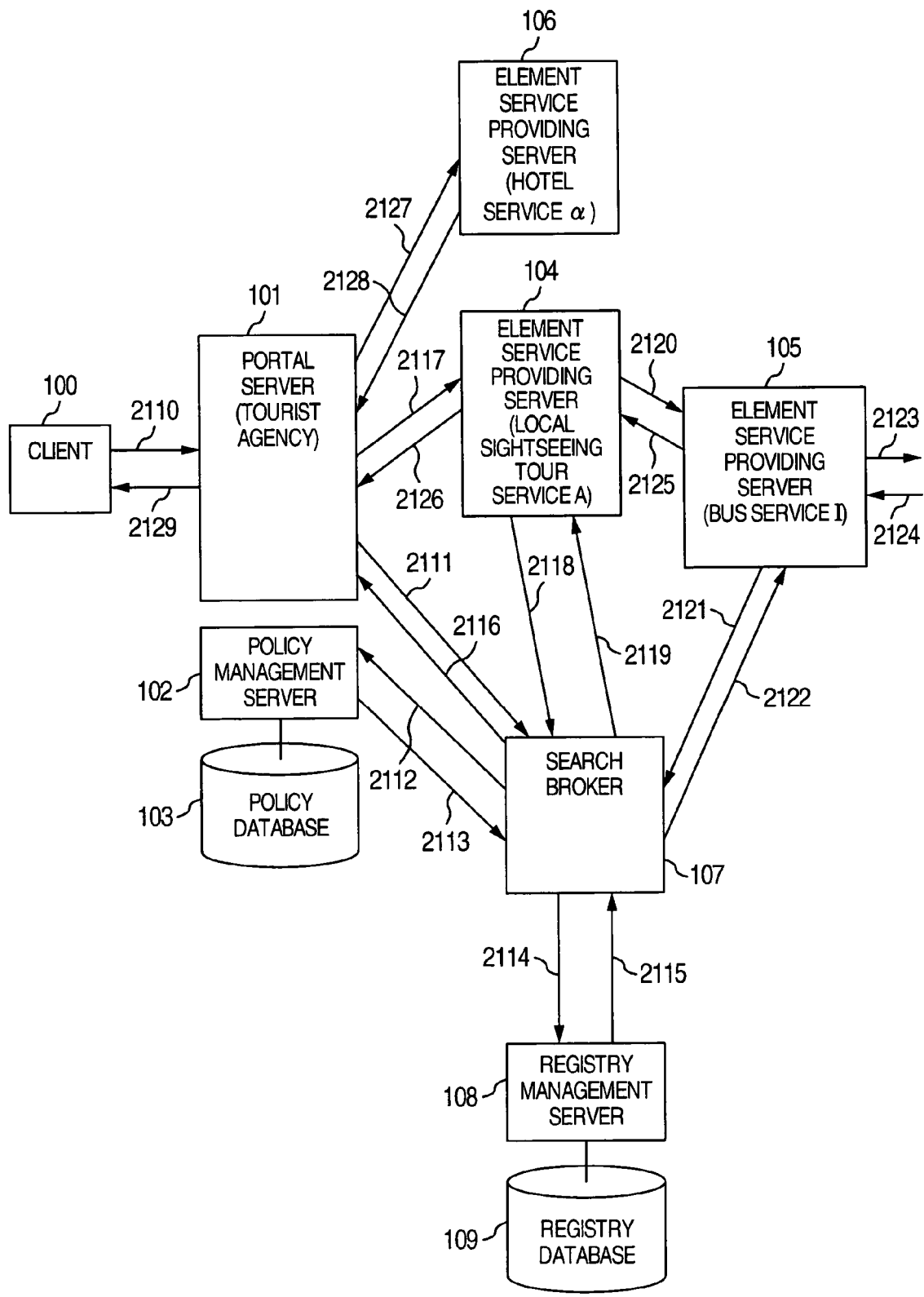
FIG. 1 is a block diagram showing the structure of provider of an element service server, according to a first embodiment of the present invention.

FIG. 1 is a block diagram showing the structure of a service providing system, according to a first embodiment of the present invention. The first embodiment provides service which enables the user to reserve sightseeing service, a hotel, a bus, and so on through a local tourist agency in the tourist industry, taken as an example.

This service providing system consists of a client 100 which the user operates, a portal server 101 serving as a portal for the user, and element service providing servers (local sightseeing tourist service 104, bus service 105, and hotel service 106) and so on.

The client 100 is a terminal which the user operates to request a supply of service and receive a result, and on this terminal the Web (World Wide Web) browser and a dedicated client program are running. The portal server 101 is a server acting as a portal for accepting service requests from users, and when receiving a service request from a user, the portal server 101 asks the search broker 107 for information about another element service providing server at the next stage, which will provide an element service. According to the result of inquiry, the client sends a request to another element service providing server at the next stage for a supply of service.

The user makes an access through the client 100 to the portal server 101 (2110), starts to request service and makes use of service. On receiving a request from a user, the portal server 101 transmits a request to the search broker 107 to search for element services that provide necessary service to implement the request from the user (reservations of hotel service and sightseeing service at the site, for example) (2111). In this first embodiment, one is supposed to reserve a sightseeing tour at the site, and then reserve a hotel. The order may be reversed or both reservations may be carried out at the same time.

After receiving, from the portal server 101, a request for search for service to reserve a sightseeing tour at the site (2111), the search broker 107 makes an inquiry to the policy management server 102 about the user's policy about a local sightseeing tour service (2112). The policy management server 102 that has received the inquiry obtains user-policy information about local sightseeing tour from the policy database 103, and returns a search result to the search broker 107 (2113). Then, the search broker 107 makes an inquiry to the registry management server 108 to see if there is any element service providing server which provides service that meets a search request from the portal server 101 (local sightseeing tour service)(2114). The registry management server 108 that has received the request searches the registry database 109 and returns a list of element service providing servers that meet the search conditions (2115). After this, the search broker 107 applies the user's policy information to the list of element service providing servers, extracts only information about element service providing servers that provide service that the user requires, and returns the information to the portal server 101 (2116).

When the portal server 101 receives the information about the element service providing server 104 (local sightseeing tour service A), calls the element service providing server 104 and asks to carry out a process of service (2117). The called element service providing server 104 carries out the requested process and furthermore, just as the portal server 101 did, asks the search broker 107 to search for another element service providing server at the next stage that meets the user's policy (2118), and receives information about an element service providing server 105 as a search result from the search broker (2119). Similarly, the element service provider server 105 asks the search broker 107 to search for an element service providing server (2121), receives information about another element service providing server at the next stage (2122), and sends a request to another element service providing server at the next stage to carry out a process (2123) and receives a service process result (2124). When the process in the element service providing server at the next stage is finished, the element service providing server 104 receives a process result (2125) and transmits the results of all service processes to the portal server 101 (2126).

By this series of processes, the local sightseeing tour service is called, and the reservation of sightseeing tour is completed.

Then, the portal server 101 calls a service for hotel reservation. Also when calling a hotel service, the portal server 101 asks the search broker 107 to search for the element service providing server 106 (2127), and receives a result of hotel reservation (2128).

In the manner as described, the portal server 101 requests the search broker 107 to search for an element service providing server that meets the user's policy, and carries out service. By executing the process to call the element service server recursively, composite service can be realized.

Figure 2:
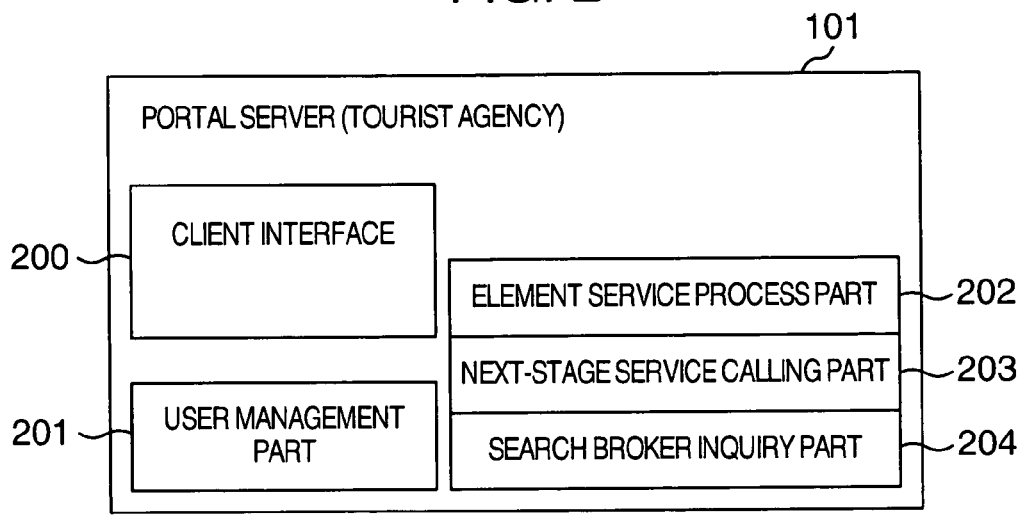
FIG. 2 is a block diagram showing the detail of a portal server 101, according to the first embodiment of the present invention.

FIG. 2 is a block diagram showing the detail of the portal server 101.

The portal server 101 includes a client interface part 200, a user management part 201, an element service processing part 202, a next-stage service calling part 203, and a search broker inquiry part 204.

The client interface part 200 receives a process request from a user, sends a process result to the user and shows the process result, whereby it functions as an interactive interface. For this client interface part 200, a Web (World Wide Web) interface using HTTP (Hypertext Transfer Protocol) protocol is generally used, but an interface of one's own choice using a protocol of one's own choice may be used.

The user management part 201 manages users' accounts and their session IDs. The user who receives a supply of hierarchical service has his or her user name registered in the portal server 101, and obtains a personal account. The registered user inputs policy information in the policy database 103. After having the user name registered, policy information which has been input once need not be input again and can still be used the same as before. When a user makes a request for service, the portal server 101 assigns a session ID for that request. By using session IDs, the portal server 101 can perform a process without executing redundant processes to satisfy other users or their requests.

When the portal server 101 receives a service request from a user through its client interface part 200, its search broker inquiry part 204 makes an inquiry to the search broker 107 to see if there is any element service providing server at the next stage to call to ask it to execute a service process (2111 in FIG. 1). When receiving a result of inquiry from the search broker 107 (2116 in FIG. 1), according to the result of the inquiry the next-stage calling part 203 calls another element service providing server at the next stage. Note that the element service process part 202 performs the process peculiar to the portal server. The process peculiar to the portal server is a process of counting service charge for the user, for example.

The element service providing server (104, 105 or 106) has the same structure as the portal server 101, excepting that the client interface part 200 and the user management part 201 are excluded. The element service providing server (104, 105 or 106) also includes the element service process part 202, the next-stage service calling part 203 and the search broker inquiry part 204.

Figure 3:
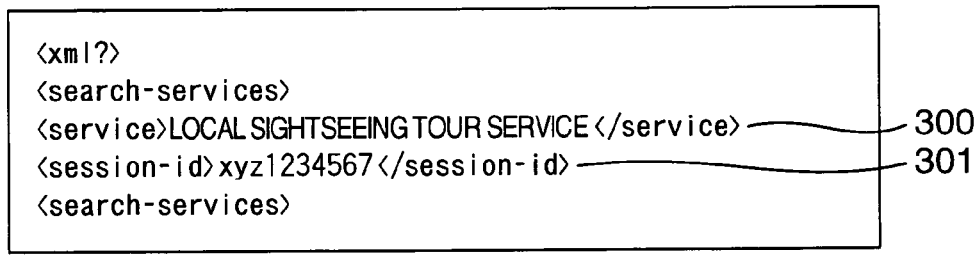
FIG. 3 is an explanatory diagram showing an example of a telegram from the portal server 101 to request a search broker 107 to make a search, according to the first embodiment of the present invention.

FIG. 3 is an explanatory diagram showing an example of request data (2111 in FIG. 1) by which the portal server 101 asks the search broker 107 to make a search.

The content of a telegram is written in XML (extensible Markup Language) as shown in FIG. 3. The telegram includes at least the kind of service to search for (300) and a session ID of the user (301). In the kind of service (300), the content of service provided by an element server is written, and in the session ID, the user who made a request (and a service request) is written. In the example in FIG. 3, the kind of service (300) is "local sightseeing tour service" bracketed by the <service> and </service> tags. The session ID (301) is "xyz1234567" bracketed by the <session-id> and </session-id> tags.

Figure 4:
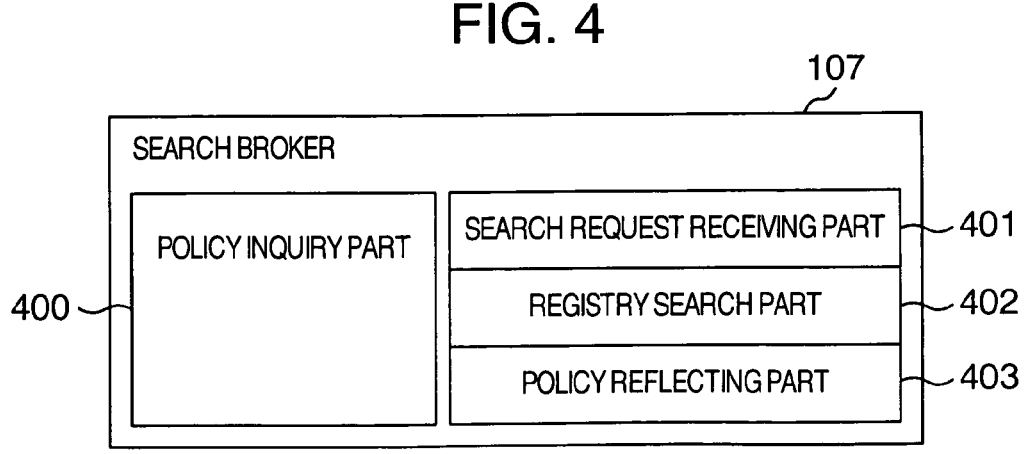
FIG. 4 is a block diagram showing the detail of the search broker 107, according to the first embodiment of the present invention.

FIG. 4 is a block diagram showing the detail of the search broker 107.

The search broker 107 includes a policy inquiry part 400, a search request receiving part 401, a registry search part 402, and a policy reflecting part 403.

The policy inquiry part 400 asks the policy management server 102 for the policy information of the user. The search request receiving part 401 receives a search request from the portal server or the element service providing server. The search request receiving part 401 also serves as a search result transmitting part to return a search result. The registry search part 402 asks the registry management server 108 to see if there is any an element service providing server that can provides an element service requested. The policy reflecting part 403 applies the user's policy to a list of element service providing servers received from the registry management server 108 as the result of the search made by the registry search part 402. Thus, the policy reflecting part 403 acts as a policy-based server extracting part that extracts (by filtering) only element service providing servers that meet the conditions specified by the user's policy.

Figures 5, 6:
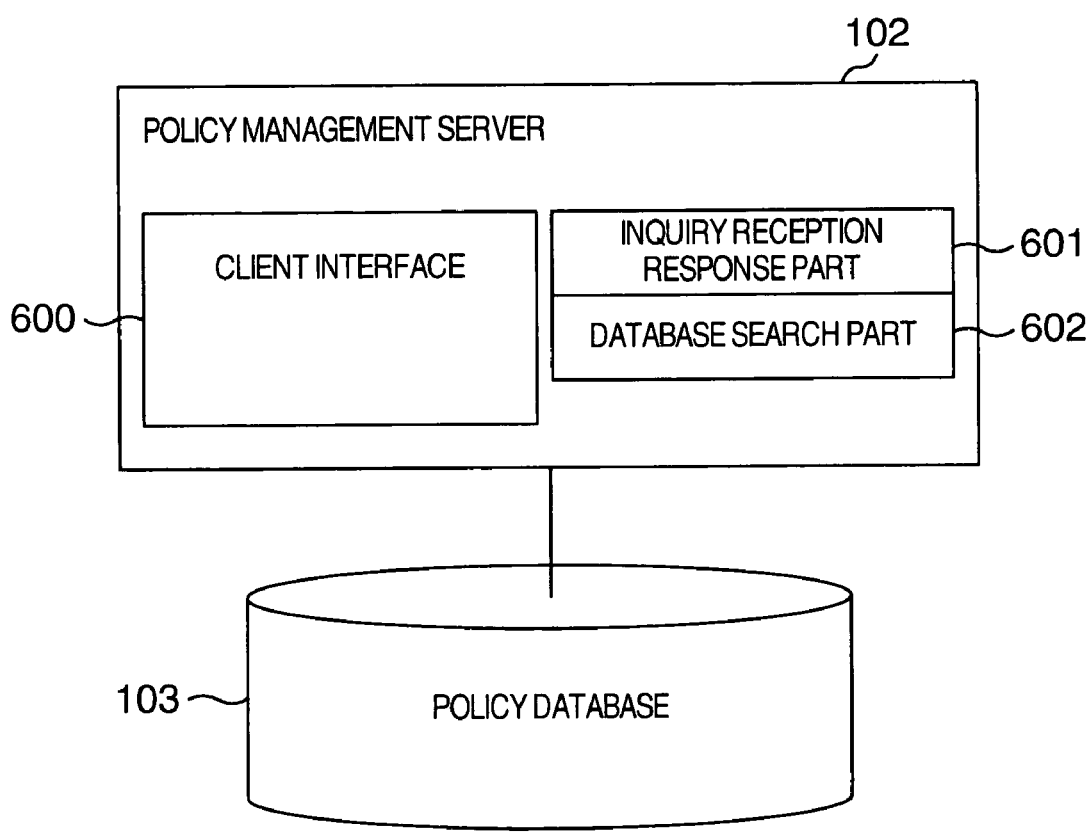
FIG. 5 is an explanatory diagram showing an example of a telegram from the search broker 107 to request the policy management server 102 to make policy inquiries, according to the first embodiment of the present invention.
FIG. 6 is a block diagram showing the detail of the policy management server 102, according to the first embodiment of the present invention.

FIG. 5 is an explanatory diagram showing an example of an inquiry request telegram (2112 in FIG. 1) asking the policy management server 102 for the user's policy.

When receiving a search request program (FIG. 3) from the portal server 101, the search broker 107 extracts the kind of service (300 in FIG. 3) and a session IF of the user (301 in FIG. 3) and generates a telegram including the kind of service in the inquiry request (500) and the user's session ID (501), and sends the telegram to the policy management server 102 to the policy management server 102 to inquire about the policy regarding the kind of service.

FIG. 6 is a block diagram showing the detail of the policy management server 102.

The policy management server 102 includes a client interface 600, an inquiry reception and response part 601, and a database search part 602. The policy management server 102 is connected to the policy database 103.

The client interface 600 generates policy information anew when the policy information from the user is written in the policy database 103, or updates data already written. The inquiry reception and response part 601 receives an inquiry about policy from the search broker 107, and transmits a result to the search broker 107. The database search part 602 searches the policy database 103 for policy information.

When the policy management server 102 receives a policy search request from the search broker (FIG. 5), the policy management server 102, through its database search part 602, searches the policy database 103 by using the kind of service (500 in FIG. 5) as a search key. The inquiry reception and response part 601 returns the policy information of the user corresponding to the kind of service searched for to the search broker 107.

FIG. 7 is a table showing an example of the recorded contents of the policy database 103.

The policy database 103 has a table as shown in FIG. 7 for each user. This table includes the policy items and the policy conditions each two or more in number for each kind of service. For example, as shown in FIG. 7, in the row of the kind of service "sightseeing tour service", "Available" is recorded in the policy condition column to correspond with the adjacent "Nursing-care service" in the policy item column. Similarly, in the row of the kind of service "Sightseeing tour service", "AA or higher" is recorded in the policy condition column to correspond with the adjacent "Rating" of the agency in the policy item column.

Out of the data recorded in the policy database 103, the method for selecting a table corresponding to the user uses a table which associates the session ID (501 in FIG. 5) with the user identifier assigned to each account of the user. This table is held by the user management part 201 of the portal server. When receiving an inquiry about policy, the policy management server 102 makes an inquiry to the portal server by using the session ID of the user, and obtains information about the user.

FIG. 8 is an explanatory diagram showing an example of policy information (2113 in FIG. 1) which is returned by the policy management server 102 to the search broker 107.

The policy information 800 which is returned has the policy items and policy conditions listed to correspond with the kinds of services in the search requests. FIG. 8 shows an example of policy information sent in response to an inquiry request (FIG. 5), and the policy information includes information that a YES is for "Nursing-care service" and "AA or higher" is for "Rating" which corresponds to the kind of service "Sightseeing tour service" (500 in FIG. 5).

Thus, the search broker 107 obtains information about the user's policy (2113 in FIG. 1 and FIG. 8) as a result of the policy inquiry request (2112 in FIG. 1 and FIG. 5). The search broker 107 that has obtained the policy information calls the registry management server 108 for information about element service providing servers that provide element services.

Figures 9, 10:
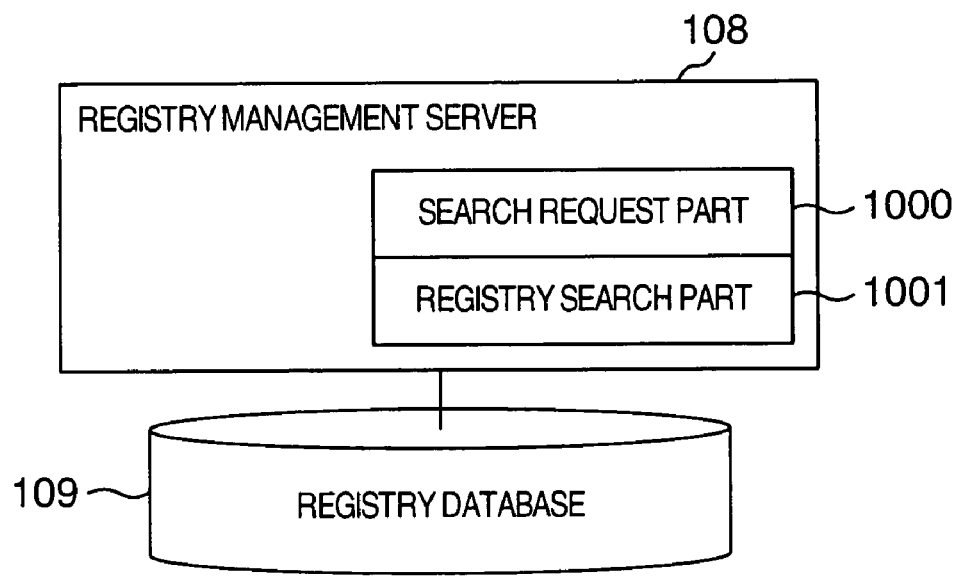
FIG. 9 is an example of a telegram from the search broker 107 asking a registry management server 108 to make inquiries about an element service providing server, according to the first embodiment of the present invention.
FIG. 10 is a block diagram showing the detail of the registry management server 108, according to the first embodiment of the present invention.

FIG. 9 is an explanatory diagram showing an example of a telegram (2114 in FIG. 1) to call the registry management server 108 to inquire about element service providing servers.

From the policy information (FIG. 8) received in response to a policy inquiry request (FIG. 5) sent to the registry management server 108, the search broker 107 extracts the kind of service 900, generates an inquiry telegram to send to the registry management server 108 to inquire about service.

FIG. 10 is a block diagram showing the detail of the registry management server 108.

The registry management server 108 includes a search request receiving part 1000 and a registry search part 1001. The registry management server 108 is connected to the registry database 109 that holds services associated with the respective element service providing servers.

The search request receiving part 1000 accepts inquiries (search requests) from the search broker 107, and returns search results. The registry search part 1001 searches for element service providing servers that provide element services about received search requests from among data stored in the registry database 109. When receiving a search request (2114 in FIG. 1 and FIG. 9) for element service providing servers, sent from the search broker 107, the registry management server 108 searches the registry database 109 by using the kind of service (900 in FIG. 9) as a search key.

FIG. 11 is a table showing an example of data held in the registry database 109.

The registry database 109 has listed the kinds of service, element service providing servers and service contents associated with each other as sets, and holds those data arranged as sets in a table. In the service contents, there are recorded the interfaces (I/F) to call up the element service providing servers, service quality, etc. The interfaces to call up the element service providing servers are technical interfaces used when actually calling the element service providing servers, for which URL (Uniform Resource Locator) and WSDL (Web Service Description Language) are used, for example. The service quality is information related to additional information of services, such as rating or whether nursing care is provided or not, for example.

FIG. 12 is an explanatory diagram showing an example of a telegram (2115 in FIG. 1) showing a list of element service providing servers to be sent back by the registry management server 108 to the search broker 107.

The registry management server 108 searches the registry database 109 by using the kind of service (900 in FIG. 9) in a request to search for an element service providing server, which came from the search broker 107, as a search key, and from a search result, generates a telegram showing a list of appropriate element service providing servers, and transmits the telegram to the search broker 107. This telegram includes an element service providing server name (1200), URL information of the interface to call an element service providing server (1201), and service additional information about an element service providing server (1202, 1203).

As a technical interface to call an element service providing server for practical purposes, a URL is written and used in this embodiment (1201), but WSDL data may be written and used.

As a result of the request to search for an element service providing server (2114 in FIG. 1; FIG. 9), the search broker 107 obtains the list of element service providing servers (2115 in FIG. 1; FIG. 9). As described above, the search broker 107 extracts element service providing servers that match the provided policy information from the list of element service providing servers.

Figures 13, 14:
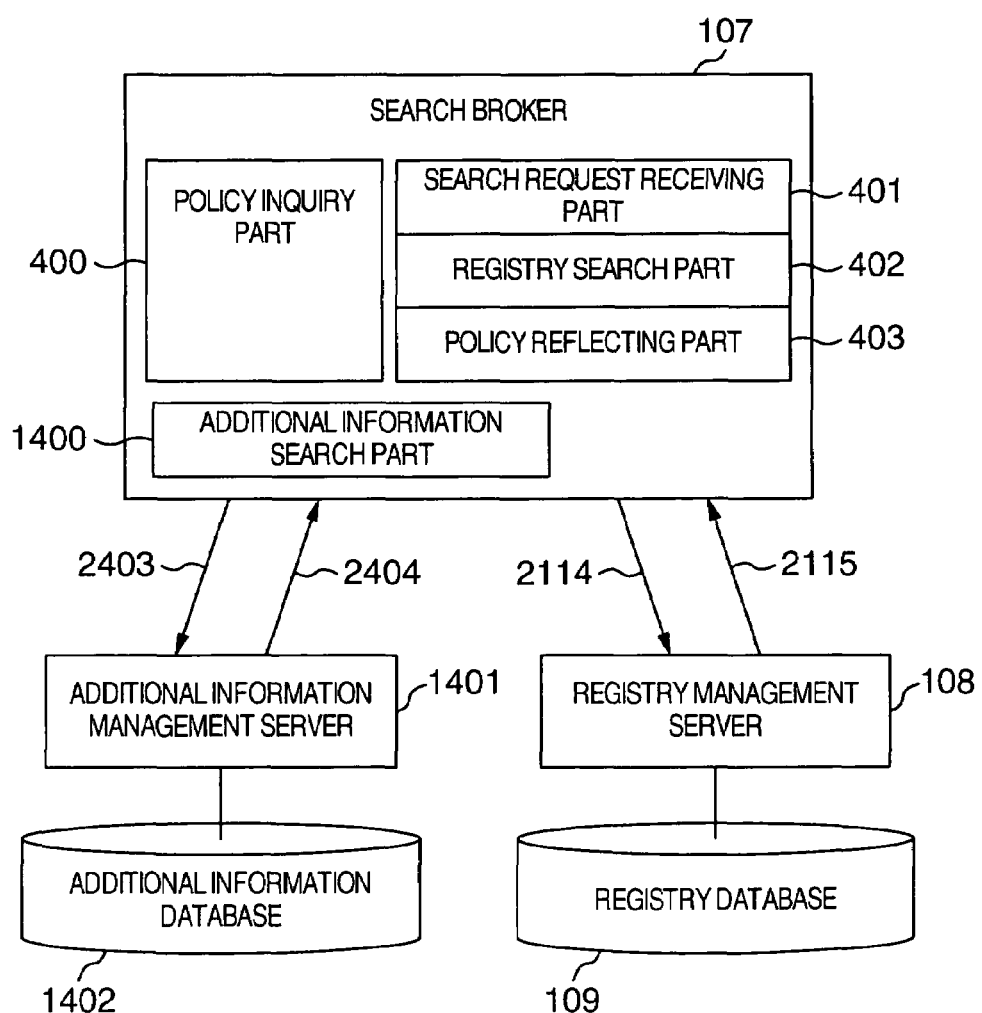
FIG. 13 is an explanatory diagram showing an example of a telegram listing element services, sent from the search broker to the portal server 101, according to the first embodiment of the present invention.
FIG. 14 is a block diagram showing the detail of the search broker 107, according to a second embodiment of the present invention.

FIG. 13 is an explanatory diagram showing an example of an element service information telegram sent back from the search broker 107 to the portal server 101 (2116 in FIG. 1).

This telegram does not include any user-policy information obtained in 2113 in FIG. 1, but shows only those which meet the user's policy out of element service providing servers in the list obtained by 2115 in FIG. 1 as well as technical interfaces such as URL.

The portal server 101, which has received the telegram from the search broker 107, and according to the content of the telegram, calls a local sightseeing tour service Aas another element service providing server 104 at the next stage (2117 in FIG. 1).

By the same step as in the portal server 101 described above, the element service providing server 104, through the intermediary of the search broker 107, searches for and calls up another element service providing server at the next stage. By a series of processes as described, the element service providing servers are organized in a hierarchical structure, and process results are sent to one preceding-stage server to another and finally the process results are collected to the portal server 101 and can be sent to the user.

As has been described, in the first embodiment of the present invention, the search broker 107 calls the policy management server to inquire about the policy of the client and obtains the client's policy, and asks the registry management server 108 to search for an element service providing server that provides service requested by the user, and obtains information about the element service providing servers. From among the obtained data, the search broker 107 extracts only an element service providing server that meets the specified policy, and transmits the information to the portal server 101. By this process, service can be formed dynamically in a manner of reflecting the user's policy without disclosing information about the user's policy to the portal server 101 from which the element service search request originated.

Description will now be made of a second embodiment of the present invention.

In the second embodiment, description will be made of a case where the content held in the registry database 109 is only basic information (technical interfaces of Web Service and the location of service providers), such as Public UDDI. Those parts that perform the same functions as those in the first embodiment are designated by the same reference numerals and their descriptions are omitted.

FIG. 14 is a block diagram showing the detail of the search broker 107 according to the second embodiment of the present invention.

The search broker 107 in the second embodiment further includes an additional information search part 1400 as an interface to an additional information management server 1401 in addition to the structure (FIG. 4) in the first embodiment. The additional information search part 1400 is connected to an additional information management server 1401 across the network. The additional information management server 1401 is connected to the additional information database 1402.

FIG. 15 is a table showing an example of the content held in the registry database 109. The registry database 109 contains standard contents, such as technical interfaces, e.g., URL, to call element service providing servers, the location (address for example) of service providers, etc. In this case, because this registry database 109 does not contain conditions corresponding to policy information about service requested by the user, it is difficult to apply the user's policy to data in the registry database 109. In this respect, the additional information database 1402 is further provided which contains additional information about element service providing servers to comply with policy information, and the search broker 107 is connected to an additional information management server 1401 connected to the additional information database 1402.

FIG. 16 is a table showing an example of the content of the additional information database 1402.

The additional information database 1402 provides additional information about the element service providing servers. Additional information in the second embodiment includes Rating information and information about whether or not nursing care is provided. This additional information is stored associated with the additional information management server 1401. The additional information database 1402, which is managed by the additional information management server 1401, searches the contents of the additional information database 1402 at a request from the search broker 107.

Description will be made of a process in which the search broker 107 according to the second embodiment searches the additional information database 1402 and returns a search result to the portal server 101 (or the element service providing server) by referring to FIGS. 14 and 1.

On receiving a search request (2111 or 2118) from the portal server 101 (or an element service providing server 104), the search broker 107 calls the policy management server 102 to inquire about the policy information of the user to begin with (2112). In response to the inquiry request, the policy management server 102 obtains the policy information of the user from the policy database, and transmits a result to the search broker 107 (2113).

Then, the search broker 107 calls the registry management server 108 to inquire if there is any element service providing server which meets the request of the portal server 101 (2114). Responding to the inquiry, the registry management server 108 searches the registry database 109 and sends back a list of element service providing servers that meet the request (2115).

After this, the search broker 107 calls the additional information management server 1401 for additional information corresponding to the obtained list of element service providing servers (2403). Responding to request, the additional information management server 1401 searches the additional information database 1402 and returns additional information for the list of element service providing servers (2404).

Then, the search broker 107 extracts an element service providing server that matches the policy information obtained from the policy management server 102 on the basis of the obtained element service providing server list and the obtained additional information of the element service providing servers. The search broker 107 also returns a list of the extracted element service providing servers to the portal server 101 as the source of the search request (or the element service providing server 104)(2116 or 2119).

As has been explained, according to the second embodiment of the present invention, by providing a database containing additional information about element service providing servers (additional information database 1402), it is possible to select an element service providing server based on the user's policy even when the registry management server 108 stores only basic information, such as in Public UDDI.

Description will now be made of a third embodiment of the present invention.

In a third embodiment of the present invention, the portal server 101 and every one of the element service providing servers select an appropriate element service providing server according to policy information of the user and execute the request. Those parts which perform the same functions as those in the first embodiment are designated by the same reference numerals and their descriptions are omitted.

Figure 17:
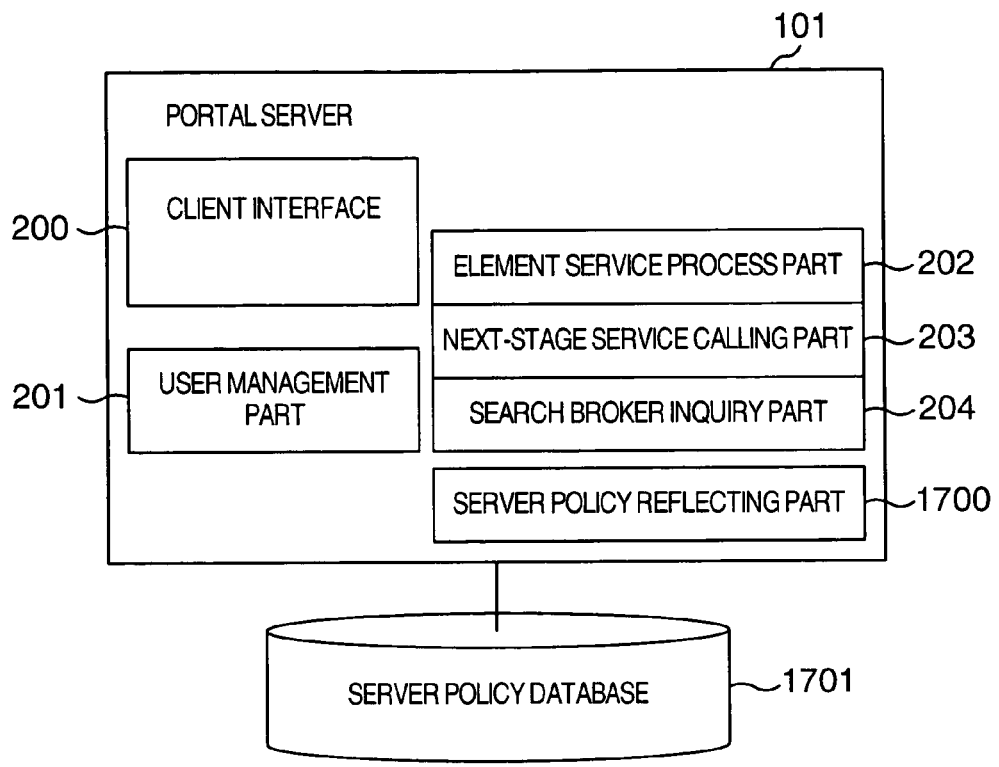
FIG. 17 is a block diagram showing the detail of the portal server 101, according to a third embodiment of the present invention.

FIG. 17 is a block diagram showing the detail of the portal server 101 according to the third embodiment of the present invention. The portal server 101 includes a server policy reflecting part 1701 transmits a server's policy to the server policy database 1701 and reflects the policy in service. The portal server 101 is connected to the server policy database 1701 to store policy information of its own.

Figure 18:
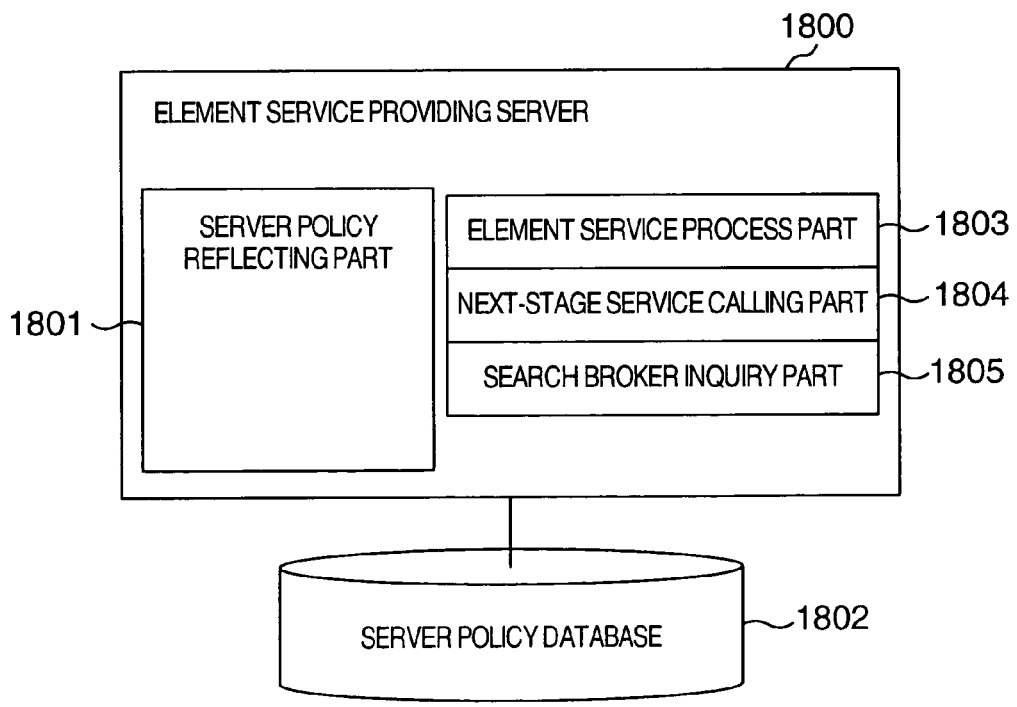
FIG. 18 is a block diagram showing the detail of an element service providing server 1800, according to the third embodiment of the present invention.

FIG. 18 is a block diagram showing the detail of an element service providing server 1800 according to the third embodiment of the present invention. The element service providing server 1800 includes a server policy reflecting part 1801 which transmits a server's policy to the server policy database 1802, and reflects the policy in service. The element service providing server 1800 is connected to the server policy database 1802 to store policy information of its own.

The contents of server policies stored in the server policy database (1701, 1801) correspond to know-how of companies that operate element service providing servers, examples of which are merits evaluated by users that if an umbrella contract is concluded, certain affiliated hotels can be used at a low hotel charge, that the use of hotels in certain combinations makes charges less expensive, and so on.

By referring to FIGS. 17, 18 and 1, calls for element services in which server policies are reflected will be described.

When the portal server 101 receives a request from a user, the search broker inquiry part 204 asks the search broker 107 to search for an element service providing server (2111), and obtains and returns a list of element service providing servers to the portal server 101 (2116).

On receiving the search result, the search broker inquiry part 204 applies server policy information that it possesses to the obtained list of element service providing servers and obtains the most appropriate element service providing server. In other words, the search broker inquiry part 24 obtains information about the element service providing servers in the list from the server policy database 1701, and selects the most appropriate element server based on the obtained information.

Then, the next-stage service calling part 203 calls the selected element service providing server and asks it to execute a service process (2117).

This process is identical to the process in the element service providing server 104.

As has been described, in the third embodiment of the present invention, information about policies about element service providing servers is provided at each element service providing server (or the portal server 101) which is separate from policy information of users; therefore, it becomes possible to utilize know-how that the element service providing server possesses as a guideline for selecting an element service providing server.

Description will proceed to a fourth embodiment of the present invention.

The fourth embodiment is structured so that server policy information in the third embodiment can be fed back in the form of evaluation results by users. Those parts which perform the same functions as in the first to third embodiments are designated by the same reference numerals and their descriptions are omitted.

Referring to FIG. 9, description will be made of automatic expansion of server policy information according to the fourth embodiment of the present invention. The automatic expansion of server policy information is a mechanism in which services provided by element service providing servers 1900 and 1901 at the next stages called up by the element service providing server 1800 are subjected to evaluation by users and evaluation results are stored as server policy information and reflected to services. This automatic expansion of server policy information contributes to accumulation of know-how of the element service providing servers.

An element service providing server 1800, when called up by the element service providing server at the preceding stage (2906), carries out service of its own, then calls up element service providing servers (1900, 1901) at the next stages (2902, 2904) and receives results of services executed (2903, 2905). The results of services executed are sent back to the element service providing server (2907).

At this time, the contents of the evaluation items of the element service at the next stage, which the element service providing server 1800, are sent back, too. In other words, because bus transport service (by the element service providing server 1900) and hotel service (by the element service providing server 1901) were asked for as element services at the next stages, and results of different evaluation items of bus transport service and hotel service are fed back to the element service providing server at the preceding stage.

Figures 19, 20:
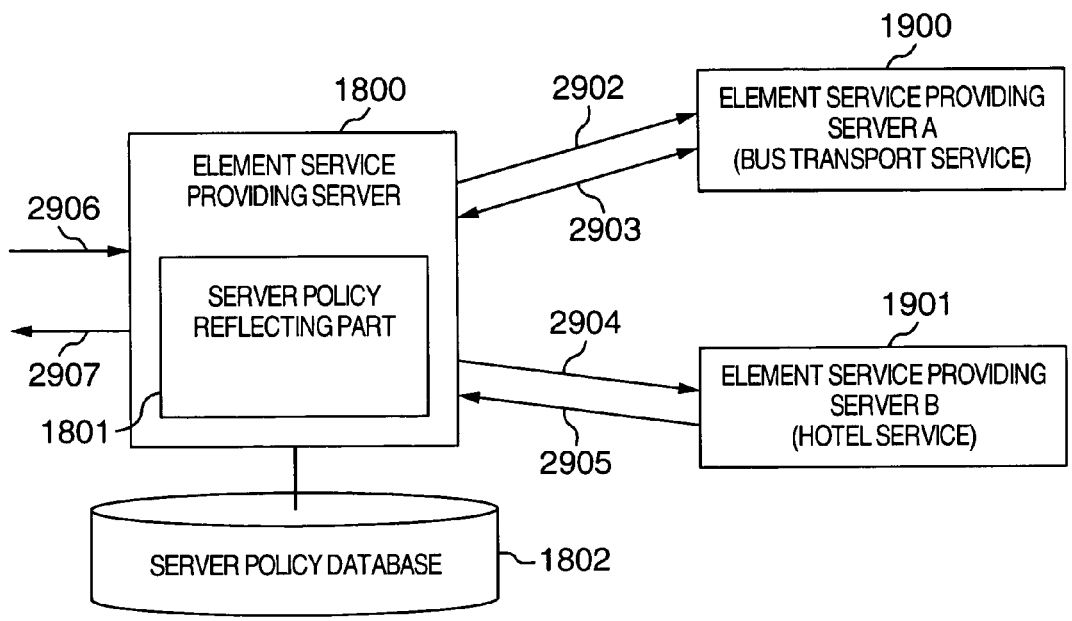
FIG. 19 is a block diagram showing the detail of the element service providing server 1800, according to a fourth embodiment of the present invention.
FIG. 20 is a table showing an example of evaluation items, according to the fourth embodiment of the present invention.

FIG. 20 is a table showing an example of evaluation items.

The evaluation items of "bus ride quality" and "attitudes of attendants" in bus transport service are evaluated at five levels, and the evaluation items of "service by hotel workers" and "quality of the room" in hotel service are evaluated at five levels.

The evaluation items may be defined for individual companies which operate the servers or otherwise may be defined for different kinds of services. As for the evaluation method, an N-level evaluation such as the one shown in FIG. 20 or some format, such as a for-or-against vote, or a free-format evaluation, such as opinions or requests, may be adopted.

Data of the respective evaluation items are sent back one after another to the element service providing servers at the preceding stages, and finally collected at the portal server 101. When the user is provided with service, data of all evaluation items are sent from the portal server 101 to the client 100, and shown to the user, who evaluates services with regard to the evaluation items.

After the evaluation by the user, evaluation data is sent to the portal server 101 and the element service providing servers. At this time, the user's evaluation is not sent to the element service providing server at the extreme end, but sent back only to the element service providing servers who sent out requests for element services. On receiving the user's evaluation result, the portal server 101 or the element service providing server 1800, through their server policy reflecting part (1700, 1800), makes the user's evaluation reflected in the server policy database (1701, 1802).

The server policy reflecting part (1700, 1801), by using credibility rating set for each user, has the user's evaluation reflected automatically in the database when the user is highly trustworthy. On the other hand, when the user is less trustworthy, another arrangement may be provided such that the server policy reflecting part (1700, 1800) notifies the operator that he is not much trustworthy, and then the operator sorts out effective evaluation and ineffective evaluation and manually makes the effective evaluation reflected in the database. The credibility rating may be set so that users with high frequency of use are given a higher level of credibility, for example.

When the users' evaluation is collected in a free format, such as opinions or requests, they may be manually reflected to the database by the operator.

In the fourth embodiment, when server-side policy is reflected, the search broker is not necessarily required, but an ordinary registry, such as a UDDI, may be used.

As has been described, according to the fourth embodiment of the present invention, as the evaluation of service the user received is fed back to the policy database of the company that operates the element service providing server, the policy information which is know-how of the element service provider company can be expanded and maintained automatically.

In addition to reservation service in tourist agencies which has been described in the above-mentioned embodiments, the present invention can also be applied to a business model as will be described in the following.

(a) In exchange of stocks, to utilize service of compiling a portfolio, policies on stock names are input previously in the database. When a portfolio compiling service is called based on specified policies, by selecting and executing specific services compatible with the policies out of various services of trust companies and securities houses, a portfolio befitting policies can be prepared.

(b) For the use of accounting service distributed over the network, policies on services to meet accounting requests (the reliability and time limits of accounting) are input previously in the database. When accounting service is called based on specified policies, only accounting services matching the portfolio is selected and carried out.

(c) For the use of parts procuring service for products, policies on parts manufacturers and parts vendors are input in the database. When parts procuring service is used based on the policies, parts matching the policies can be obtained. If service is organized in a hierarchical structure for component parts, too, it is possible that the policies are reflected in all parts.

(d) For the use of talent recruiting service from a talent bank, if policies on talents are input in the database and talent recruiting service is used based on the prescribed policies, desired people matching the policies can be secured.

(e) In order for the employees of a corporate organization to use service, it may be arranged that the employee policy database reflects the organizational policies. When this service is used based on specified policies, it is possible to prevent the execution of service by the employees from interfering with the organizational policies.

By the application of the present invention to services as mentioned above, policy-based customization of service is realized free of invasion of privacy of users, which makes possible differentiation from competitor companies. The differentiation offers the base by which to make greater earning from service charges from users than the competitive firms. Or, if service charges are supposed to be the same, a better usability of service will contribute to an increase in the number of users, thus probably increasing the profit rate for the tourist agency. At any rate, the tourist agency will be able to receive some measure of option premium from users.

Meanwhile, for the element service providing companies, if the number of users increases, there is a high possibility that their service is used by many people, and they probably wish to provide service on the basis of the present invention. The tourist agencies can demand greater policy-based service charges in compensation for better service.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A search system implemented on a computer network having a plurality of computer processor for distributed processing of web services, comprising:
    a portal server for serving as a portal of a composite service requested by a client;
    a group of service servers for providing more than two element services organized in a hierarchical structure for providing the composite service;
    a search broker for searching for a service server providing an element service, the search broker being connected with the client via the portal server and connected with the group of service servers;
    a policy database for holding policy information about service contents requested by the client;
    a policy management server for searching for policy information in the policy database connected with the policy management server in response to a request by the search broker;
    a registry management server for holding contents of element services provided by the service servers, the registry management server being connected with a registry database, wherein
    the search broker searches for a service server that provides an element service in accordance with a search request by the portal server or a service server among the group of service servers, and inquires policy information from policy management server,
    the policy management server extracts the policy information from the policy database and sends the extracted policy information to the search broker, and
    the search broker inquires from the registry management server information regarding the service server that provides an element service in accordance with the search request, extracts from the registry database the information regarding the service server that provides an element service in accordance with the search request, and sends to the search broker the information regarding the service server that provides an element service in accordance with the search request,
    wherein the portal server receives a request of the composite service from the client, requests the search broker to search for a service server matching with an element service in a first stage structuring the composite service, obtains information about the service server matching with the element service in the first stage structuring the requested composite service from the search broker, and requests the element service from the service server matching with the element service in the first stage structuring the requested composite service, and the service server matching with the element service in the first stage provides the element service in the first stage,
    wherein each service server which provides an element service requests a search for a service server matching with an element service in a next stage structuring the requested composite service to the search broker, obtains information about the service server matching with the element service in the next stage structuring the requested composite service from the search broker, and requests the element service in the next stage structuring the requested composite service to the service server matching with the element service in the next stage structuring the requested composite service, and
    the service server matching with the element service in the next stage structuring the requested composite service carries out the element service in the next stage structuring the requested composite service and sends a result of the element service in the next stage to the service server which requested the element service in the next stage, and
    wherein the service server matching with the element service in the first stage sends a result of the composite service to the portal server.

2. A search system according to claim 1,
    wherein the search broker includes an additional information database storing additional information related to a service provided by the service server,
    wherein the search broker obtains additional information of the service server matching with the requested service from the additional information database, and
    wherein the search broker extracts the service server matching with the policy information of the client among service servers relating to the information, in reference with the additional information of the service server.

3. A search system implemented on a computer network having a plurality of computer processor for distributed processing of web services, comprising:

a portal server for serving as a portal of a composite service requested by a client;

a group of service servers for providing more than two element services organized in a hierarchical structure for providing the composite service;

a search broker for searching for a service server providing an element service, the search broker being connected with the client via the portal server and connected with the group of service servers;

a policy database for holding policy information about service contents requested by the client;

a policy management server for searching for policy information in the policy database connected with the policy management server in response to a request by the search broker;

a registry management server for holding contents of element service provided by the service servers, the registry management server being connected with a registry database, wherein the portal server receives a request of the composite service from the client, wherein the portal server requests the search broker to search for a server matching with an element service in a first stage structuring the requested composite service, wherein the portal server obtains information about the service server matching with element service in the first stage structuring the requested composite service from the search broker, and requests the element service from the service server matching with the element service in the first stage structuring the requested composite service; and the service server matching with element service in the first stage structuring the requested composite service, wherein each service server which provides an element service requests a search of a service server matching with an element service in a next stage structuring the requested element service to the search broker, obtains information about the service server matching with the element service in the next stage structuring the requested composite service from the search broker, and requests the element service to the service server matching with the element service in the next stage structuring the requested composite service, wherein the service server matching with the element service in the next stage structuring the requested composite service carries out the element service in the next stage and sends a result of the element service in the next stage to the service server which requested the element service in the next stage, and wherein the service server matching with the element service in the first stage sends a result of the composite service to the portal server.

4. A search system according to claim 1, wherein the portal includes a portal server policy database for storing information for selecting a service server in a lower layer, wherein the service server includes a server policy database for storing information for selecting a server in the lower layer, wherein the portal server extracts a service server conforming to policy information of the portal server policy database among the obtained service servers matching with the requested service, and requests the service for the extracted service server, and wherein the service server extracted by the portal server extracts a service server conforming to the policy information server policy database among service servers obtained as matching with the requested service, and requests the server extracted by the service server extracted by the portal server to provide the requested service.

5. A search system according to claim 1, wherein the portal server includes a portal server policy database for storing information for selecting a service server in a lower layer, wherein the portal server receives from the service server which requested the service a result of the service and information for evaluating the service, and wherein on the basis of information for evaluating the service, evaluation by the client of the service provided by the server is reflected in the portal server policy database.

6. A search system according to claim 3, wherein on the basis of a result of comparison between reliability being set for the client and a predetermined standard value, the portal server determines whether to automatically reflect the evaluation of the service servers's service in the portal server policy database or to inquire from an operator if the evaluation of the service server+s service will be reflected in the portal server policy database.

7. A search system according to claim 1, wherein the server includes a server policy database for storing information for selecting a server in a lower layer, and sending information for evaluating the server with a result of service of which request is received in the third or fourth step to a source of the service request, and wherein on the basis of information for evaluating the service, among evaluations of service of the server carried out by the client, the evaluation of the service of the server in the lower layer is reflected to the server policy database.

8. A search system according to claim 5, wherein on the basis of a result of evaluation between a reliability value set for the client and a predetermined reference value, the server determines whether to automatically reflect the evaluation of the service in the portal server policy database or to inquire from an operator if the evaluation of the server's service will be reflected in the portal server policy database.

9. A search system according to claim 1, wherein the service server matching with the element service in the next stage requests a search for a service server matching with an element service in a subsequent stage structuring the requested composite service to the search broker, obtains information about the service server matching with the element service in the subsequent stage structuring the requested composite service from the search broker, and requests the element service in the subsequent stage structuring the requested composite service to the service server matching with the element service in the subsequent stage structuring the requested composite service, and the service server matching with the element service in the subsequent stage structuring the requested composite service carries out the element service in the subsequent stage structuring the requested composite service and sends a result of the element service in the subsequent stage to the service server matching with the element service in the next stage.

* * * * *

UNITED STATES PATENT AND TRADEMARK OFFICE
CERTIFICATE OF CORRECTION

PATENT NO. : 7,590,709 B2  Page 1 of 1
APPLICATION NO. : 10/784766
DATED : September 15, 2009
INVENTOR(S) : Katsuro Kikuchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1095 days.

Signed and Sealed this

Twenty-first Day of September, 2010

David J. Kappos
*Director of the United States Patent and Trademark Office*